United States Patent [19]

Mulder

[11] 3,991,585

[45] Nov. 16, 1976

[54] COLD-GAS REFRIGERATOR

[75] Inventor: Jan Mulder, Eindhoven, Netherlands

[73] Assignee: U.S. Philips Corporation, New York, N.Y.

[22] Filed: Dec. 5, 1974

[21] Appl. No.: 529,824

[30] Foreign Application Priority Data

Apr. 29, 1974 Netherlands.................... 7405725

[52] U.S. Cl. .................................................. 62/6
[51] Int. Cl.² ........................................ F25B 9/00
[58] Field of Search ........................................... 62/6

[56] References Cited
UNITED STATES PATENTS

| | | | |
|---|---|---|---|
| 3,188,821 | 6/1965 | Chellis | 62/6 |
| 3,220,201 | 11/1965 | Heuchling | 62/6 |
| 3,552,120 | 1/1971 | Beale | 62/6 |
| 3,765,187 | 10/1973 | Horn | 62/6 |

FOREIGN PATENTS OR APPLICATIONS

185,940   10/1960   U.S.S.R. .................................... 62/6

*Primary Examiner*—Lloyd L. King
*Attorney, Agent, or Firm*—Frank R. Trifari; J. David Dainow

[57] ABSTRACT

A cold-gas refrigerator of the type in which the displacer is driven by pressure fluctuations generated in the working medium, the piston being coupled to an a.c. supplied linear actuator; the system formed by piston/armature coil assembly of the actuator and working medium resonates at a frequency which is tuned to the alternating current frequency.

8 Claims, 5 Drawing Figures

COLD-GAS REFRIGERATOR

BACKGROUND OF THE INVENTION

The invention relates to a cold-gas refrigerator comprising a working space which is formed inside a cylinder and in which a working medium performs a thermodynamic cycle; the said working space comprises a compression space of relatively higher mean temperature during operation and an expansion space of lower mean temperature during operation, said spaces communicating with each other via heat exchangers, including a regenerator. The working surface of a piston which is coupled to a drive varies the volume of the compression space during operation so as to generate pressure variations in the working medium, one working surface of a displacer which is reciprocatable at a phase difference with respect to the piston varying the volume of the expansion space, and the other working surface thereof varying the volume of the compression space in response to the said pressure variations.

A refrigerator of this kind is known from the article "Free displacer refrigeration" (Advances in Cryogenic Engineering, Volume 14, 1968, pages 361–369; Plenum Press— New York 1969). In this known machine based on the Stirling cycle, the displacer is driven by the working medium itself while utilizing the flow loss of this medium in the regenerator. The regenerator may be accommodated in the displacer. The regenerator usually consists of a filling mass metal gauze layers or lead spheres, contained in a housing; however, the regenerator can alternatively be formed by an annular gap between the displacer and the enveloping cylinder wall (French Pat. specification No. 2,074,337, Canadian Pat. specification No. 921,716).

Besides a regenerator, the Stirling refrigerator also comprises other heat exchangers: namely a "freezer" between the expansion space and the regenerator, that is to say a heat exchanger in which expanded working medium can extract heat from an object to be cooled, while usually there is also a cooler present between the compression space and the regenerator in which compression heat can be extracted from the working medium.

The major advantage of this known refrigerator is its comparative simplicity because of the lack of mechanical drive provisions at the displacer. The drive of the piston is an important factor in the objective of further simplification and miniaturization, enhancement of the operating reliability and service life, reduction of the mechanical vibrations and of the noise level, and also in the attempts to reduce the cost price.

Various attempts have been made to replace the rotary drive, in which an electric motor drives the piston by way of a crank piston rod mechanism, by a simpler and cheaper system. For example, it is known from U.S. Pat. Nos. 3,220,201 and 3,765,187 to use a linear electromagnetic drive ("direct linear electromagnetic actuator" "solenoid drive linear motor") in Stirling refrigerators wherein an armature of a soft-magnetic material (soft-iron) reciprocates under the influence of a magnetic alternating field generated by an electromagnet. However, this does not result in a real structural simplification and cost price reduction of the refrigerator.

In addition, it is a known drawback of the electromagnetic drive (linear motor) that the attracting magnets of stator and armature and the unavoidable tolerances in the centering of the moving part of the machine, cause transverse forces which result in large friction losses, fast wear, noise and mechanical vibrations.

In order to balance the forces of inertia of the moving part, coiled springs are used. Because of the large overall mass of the soft-iron armature, the piston and the connection rod, the coiled springs should have a rather heavy construction and substantial rigidity. The spring characteristic varies in the course of time, and hence the efficiency of the machine. This necessitates periodical replacement of the springs.

SUMMARY OF THE INVENTION

The present invention has for its object to provide a refrigerator of the kind set forth which, because of the use of a simple piston drive, has a very high general structural simplicity, very small dimensions and a very low cost price in combination with a long service life, high reliability, low noise level and a minimum of mechanical vibrations.

The refrigerator according to the invention is characterized in that the piston has an electro-dynamic drive comprising an armature coil which is coupled to the piston and which is supplied during operation, with an alternating current having a frequency $f_o$. The armature coil is reciprocatable in a permanent magnetic field, produced by a magnetic circuit, under the influence of Lorentz forces exerted on the armature coil; the system formed by piston armature coil-assembly and working medium resonates during operation at a resonant frequency $f$ which at least substantially corresponds to the frequency $f_o$ and which satisfies the relation:

$$f = \sqrt{\frac{S^2 \cdot P_m}{M \cdot T_o \left\{ \frac{1}{H_c} \cdot \frac{V_c}{T_c} + \frac{1}{H_e} \cdot \frac{V_e}{T_e} + \sum_{i=1}^{n} \frac{V_{wi}}{T_{wi}} \right\}}}$$

in which
S = working surface of the piston
$P_m$ = mean working medium pressure in the working space of the machine
M = total mass of the piston/armature coil assembly
$T_o$ = ambient temperature in degrees Kelvin $H_c = \left(\frac{c_p}{c_v}\right)_c = \frac{\text{specific heat at constant pressure}}{\text{specific heat at constant volume}}$ of the working medium in the compression space $V_c$ = volume of the compression space
$T_c$ = mean operating temperature in degrees Kelvin of the working medium in the compression space $H_e = \left(\frac{c_p}{c_v}\right)_e = \frac{\text{specific heat at constant pressure}}{\text{specific heat at constant volume}}$ of the working medium in the expansion space
$V_e$ = volume of the expansion space
$T_e$ = mean operating temperature in degrees Kelvin of the working medium in the expansion space
$V_{wi}$ = the working medium volume of the $i^{th}$ heat exchanger
$T_{wi}$ = the mean operating temperature in degrees Kelvin of the working medium in the $i^{th}$ heat exchanger
n = the total number of heat exchangers.

An extremely simple and compact and hence very interesting, inexpensive displacer refrigerator is thus obtained in which the working medium, besides completing the thermodynamic cycle, performs the important function of a resilient member which determines the resonant frequency of the system for a given mass of the piston/armature coil assembly. Consequently, a special mechanical spring system of high regidity with all its complications and cost-price increasing effects can be dispensed with. The fact that it may be useful to use a very weak supporting spring so as to fix the rest position of the piston is an entirely different matter. Such a weak spring has substantially no effect on the resonant frequency of the system formed by piston armature coil assembly and working medium.

The refrigerator according to the invention offers a further advantage in that the resonant frequency can be readily and quickly adjusted by variation of the mean working medium pressure and/or of the basic volume of the working space.

The armature coil is essentially nothing but a thin electric current conductor wound on a light-weight sleeve (for example, made of hard paper). In view of the small mass of the armature coil, the mass inertia forces inherently occurring are small.

It is to be noted that it has been known for a long time (see, for example, German Auslegeschrift No. 1,139,575) to drive the compressor of a domestic compression refrigerator in an electrodynamic manner. However, the moving part consisting of piston and armature coil is coupled therein to a mechanical spring system so as to realize a resonant frequency which is about equal to the frequency of the alternating current supplied to the armature coil. As already noted, a mechanical spring system involves a variety of technical complications and has a pronounced cost-increasing effect. The construction of the springs must be rather heavy and they must be rather rigid so as to satisfy the resonance requirement of the system. In order to avoid substantial friction losses, the springs should provide perfectly linear guiding of the piston and should preferably ensure a centrically engaging spring force. Because the spring characteristic changes in the course of time, at the same time changing the efficiency of the refrigerator, the spring system should be replaced after a given period of time, or the fact must be accepted that the refrigerator has a comparatively short efficient service life.

However, in the cold-gas refrigerator according to the invention the said drawbacks are eliminated in that the working medium itself is used as a spring system, so that a mechanical spring system can in principle be dispensed with. This is based on recognition of the following. In the electrodynamically driven domestic refrigerator compressor, comprising an inlet and outlet valve for the refrigerant, (for example, freon) the piston must give off kinetic energy at a given instant during the compression stroke so as to be braked. At the instant at which this is to take place, however, the outlet valve of the compressor is open and the pressure in the working space of the compressor remains constant, with the result that the piston cannot give off its kinetic energy to the refrigerant of constant pressure. The mechanical spring system then provides the braking. In the cold-gas refrigerator according to the invention, however, the piston varies the volume of a closed-working space in which a constant quantity by weight of working medium is present. During the compression stroke of the piston, the working medium pressure continuously increases, so it is in principle possible to brake the piston by the working medium. When the given relationship is satisfied, this is indeed effected such that the working medium constitutes the resilient part of the resonant system which is formed by piston-/armature coil assembly and working medium and which is tuned to the alternating current frequency of the armature coil.

In the cold-gas refrigerator according to the invention, the system formed by piston/armature coil assembly and working medium resonates at a properly defined frequency which is very constant in time. The frequency of the alternating current applied to the coil (power supply, for example, from the public electricity mains) is hardly subject to fluctuations in practice. This means that the piston continuously performs a purely harmonic movement (sinusoidal) of one and the same frequency. As a result, it is readily possible per se to eliminate the mechanical vibration amplitude of the machine caused by the piston movement. However, the movement of the displacer is also of importance. In the refrigerator known from the said article "Free displacer refrigeration" the displacer does not perform a harmonic movement the stroke is limited in that the displacer abuts against cylinder wall portions. When analyzed, such a movement, sometimes referred to as "square sine," appears to cause besides a basic harmonic a large number of higher harmonic oscillations which cause mechanical vibrations of the machine which cannot or only hardly be compensated for. Consequently, the machine produces substantial noise. The abutting of the displacer against the cylinder wall portions, moreover, makes it impossible to operate the machine at high speeds, which implies that only low specific refrigeration powers (number of Watts per volume unit of the machine) can be realized.

These drawbacks are eliminated in the cold-gas refrigerator according to the invention in that at least one resilient member which cooperates with the displacer is provided as a displacer stroke limitation means, the resilient member and the displacer having a spring constant and a mass, respectively, such that the system formed by resilient member and displacer has a resonant frequency $f_1$ which exceeds the resonant frequency $f$ of the system formed by piston armature coil assembly and working medium.

It is thus achieved that the displacer also performs a purely harmonic movement of the same frequency as that at which the piston reciprocates, but at a phase difference with respect thereto because of the driving of the displacer by the working medium. Because the sum of the two harmonic movements again produces a harmonic movement, it is now readily possible to eliminate the mechanical vibration amplitude of the machine caused by the piston movement and displacer movement completely by means of the known vibration dampers.

By ensuring that the resonant frequency $f_1$ of the system formed by resilient member and displacer is higher than the resonant frequency $f$ of the system formed by piston armature coil assembly and working medium, it is achieved that the volume variation of the expansion space leads with respect to the pressure variations in this space, so that cold is produced in the expansion space ($\oint pd v$ positive) and that heat can be extracted from the surroundings or from an object to be cooled by way of the freezer.

In a preferred embodiment of the cold-gas refrigerator according to the invention, the resonant frequency $f_1$ exceeds the resonant frequency $f$ by at least 20%. It has been found that optimum cold production is thus possible.

The stroke of the displacer can be limited by providing a resilient member in the expansion space and/or compression space. However, in both cases there is the drawback that dead space is formed. Notably for the expansion space, having a low temperature during operation, and a working medium of high density, this means a small maximum/minimum pressure ratio and hence a low cold production.

In order to eliminate this drawback, a further preferred embodiment of the cold-gas refrigerator according to the invention is characterized in that the resilient member is accommodated in an intermediate space which is situated between the expansion space and the compression space and which is formed by cooperating wall portions of displacer and cylinder. The invention will be described in detail hereinafter on the basis of the drawing which diagrammatically shows various embodiments of the cold-gas refrigerator (not to scale).

DETAILED DESCRIPTION OF THE PREFERRED EMBODIMENTS

Figure 1:
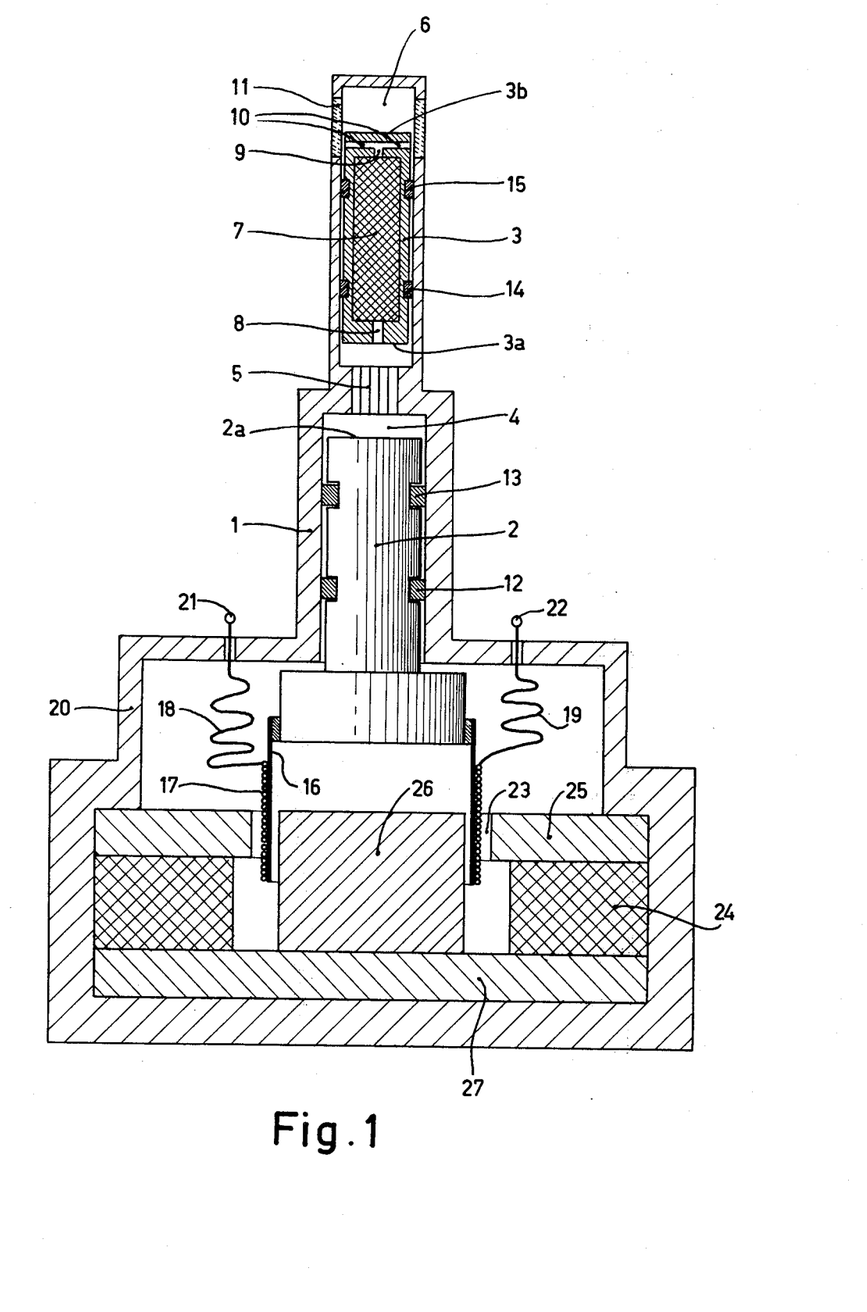
FIG. 1 is a longitudinal sectional view of a cold-gas refrigerator.

The reference numeral 1 in FIG. 1 denotes a cylinder in which a piston 2 and a free displacer 3 are reciprocable at a phase difference with respect to each other. Present between working surface 2a of piston 2 and working surface 3a of displacer 3 is a compression space 4 which accommodates a cooler 5. The upper working surface 3b of displacer 3 bounds an expansion space 6 which constitutes the working space in conjunction with compression space 4. Provided in displacer 3 is a regenerator 7 which is accessible to working medium on its lower side via a central bore 8, and on its upper side via a central bore 9 and radial flow ducts 10. The machine comprises a freezer 11 as a heat exchanger for the exchange of heat between expanded cold working medium and the object to be cooled. Between piston 2 and the wall of cylinder seals 12 and 13 are provided, while between displacer 3 and the cylinder seals 14 and 15 are provided.

When piston 2 and displacer 3 move at a phase difference with respect to each other during operation, a working medium (for example, helium or hydrogen) is alternately compressed and expanded in the working space of the machine cold being produced due to the expansion, an explanation of which can be found in the article "Free displacer refrigeration" (Advances in Cryogenic Engineering, Vol. 14, 1968, pages 361–369). The working medium is compressed when it is present mainly in compression space 4. The working medium successively flows via cooler 5, while giving off compression heat, and then through bore 8, and regenerator 7 while giving off heat, and then through bore 9 and, radial flow ducts 10 and freezer 11, to expansion space 6. The working medium is expanded when it is present mainly in expansion space 6 and then flows back again along the indicated path in the reverse sequence, heat being taken up in the freezer 11 from an object to be cooled (not shown), while in regenerator 7 the previously stored heat is taken up again.

The piston drive generally called a linear electric motor will next be described. Piston 2 is provided on its lower side with a light-weight sleeve 16 of non-magnetic and non-magnetizable material such as hardpaper or aluminium. Wound about the sleeve 16 is an electric current conductor so as to form an armature coil 17 having connected thereto current lead wires 18 and 19 which are passed through the wall of a housing 20 which is gastight connected to cylinder 1, the lead wires being provided outside the housing with electrical contacts 21, 22 respectively. Armature coil 17 can reciprocate in the axial direction of piston 2 in an annular gap 23 in which a permanent magnetic field prevails, the lines of force of which extend in radial directions transverse to the movement direction of the armature coil.

In the present case the permanent magnetic field is obtained by means of an annular permanent magnet 24 comprising poles situated on its upper side and lower side, a soft-iron annular disc 25, a solid soft-iron cylinder 26, and a soft-iron circular disc 27.

The permanent magnet and the soft-iron components together constitute a closed magnetic circuit, that is to say a circuit of closed magnetic lines of force. During operation the contacts 21 and 22 are connected to an electrical alternating current source having a frequency $f_o$ (for example, 50 Hz). Upward directed and downward directed Lorentz forces are thus alternately exerted on the A.C. supplied armature coil 17 under the influence of the permanent magnetic field in gap 23, with the result that the assembly formed by piston 2, sleeve 16 and armature coil 17 starts to oscillate. This takes place such that the resonant frequency of the system consisting of the reciprocating assembly and the working medium in the working space is at least substantially equal to the alternating current frequency $f_o$ (a deviation of 10% is still acceptable).

The working medium in the working space serves as a spring system. The alternating current should supply, via the armature coil 17, only as much energy to the resonating system formed by piston/armature coil assembly and working medium as is required to compensate for the mechanical work performed by the working medium and the friction losses. The resonance of the system at the frequency $f$ is achieved by choosing a number of machine parameters such that the following relation is satisfied $$f = \sqrt{\frac{S^2 \cdot P_m}{M.T_o \left\{ \frac{1}{H_c} \frac{V_c}{T_c} + \frac{1}{H_e} \frac{V_e}{T_e} + \sum_{i=1}^{n} \frac{V_{w_i}}{T_{w_i}} \right\}}}$$

wherein:

$S$ = working surface $2a$ of piston 2
$P_m$ = mean working medium pressure in the working space formed mainly by compression space 4 and expansion space 6
$M$ = sum of the masses of piston 2, sleeve 16 and armature coil 17.
$T_o$ = the ambient temperature in degrees Kelvin $$H_c = \frac{c_p}{c_v} = \frac{\text{specific heat at constant pressure}}{\text{specific heat at constant volume}}$$

of the working medium in the compression space 4
$V_c$ = volume of the compression space 4
$T_c$ = mean operating temperature in degrees Kelvin of the working medium in the compression space 4

$$H_e = \frac{c_p}{c_v} = \frac{\text{specific heat at constant pressure}}{\text{specific heat at constant volume}}$$

of the working medium in the expansion space 6
$V_e$ = volume of the expansion space 6
$T_e$ = mean operating temperature in degrees Kelvin of the working medium in the expansion space 6

$$\sum_{i=1}^{n} \left(\frac{V_{wi}}{T_{wi}}\right) = \left(\frac{V_w}{T_w}\right)_{\text{cooler 5}} + \left(\frac{V_w}{T_w}\right)_{\text{regenerator 7}} + \left(\frac{V_w}{T_w}\right)_{\text{freezer 11}}$$

in which
$V_w$ = working medium volume of the relevant heat exchanger, and
$T_w$ = mean working medium temperature in degrees Kelvin during operation in the relevant heat exchanger.

It will be obvious that the resonent frequency $f$ can be readily varied, for example, by changing the mean working medium pressure in the machine.

Figure 2:
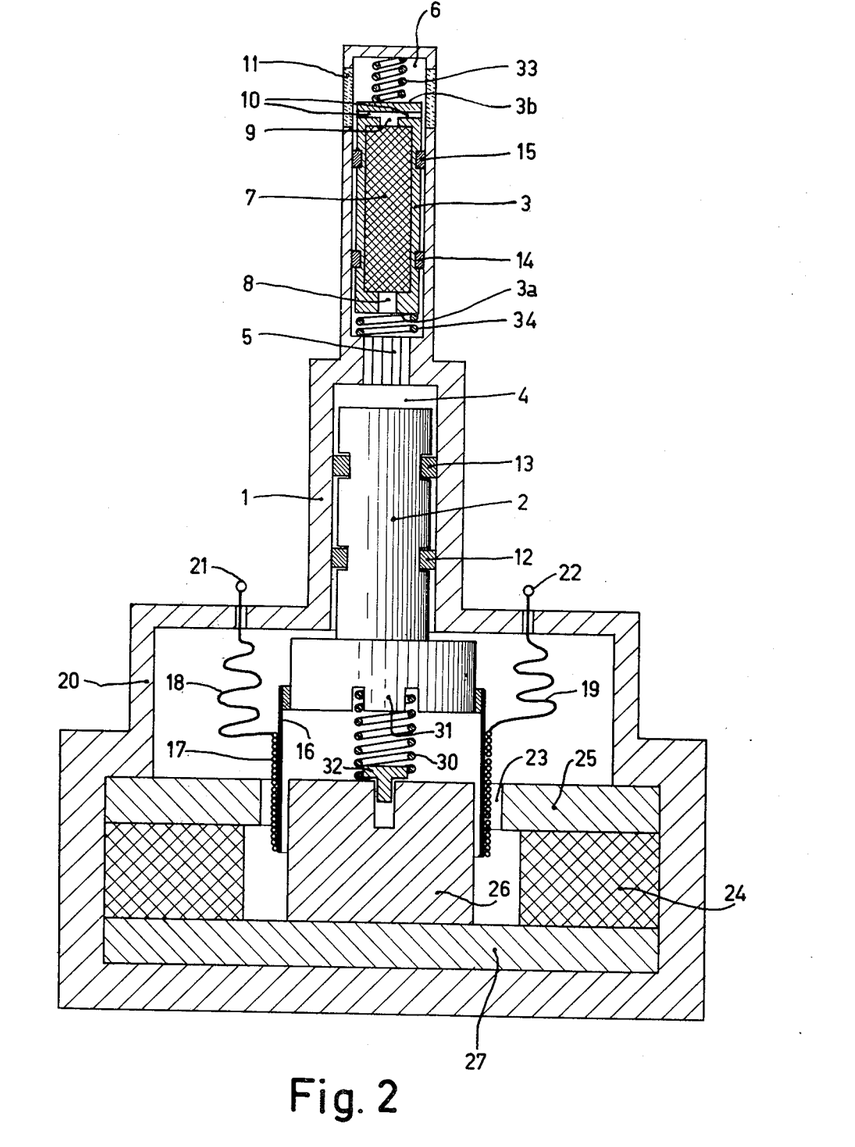
FIG. 2 is a longitudinal sectional view of a cold-gas refrigerator in which resilient members which cooperate with the displacer are present on the upper and lower side of the displacer, the piston being provided with a very weak supporting spring so as to fix its central position.

For the cold-gas refrigerator shown in FIG. 2, substantially corresponding to that shown in FIG. 1, the same reference numerals have been used for corresponding components. In this case a very weak supporting spring 30 is provided which ensures a fixed central position (rest position) of the piston. In comparison with the working medium as a gas spring, a supporting spring of this kind has an almost negligible spring constant, so it has hardly any effect on the resonant system formed by piston/armature coil assembly and working medium. The ends of supporting spring 30 are locked against transverse shifting in that they are arranged about projections 31 and 32.

Provided on both sides of the free displacer 3 are resilient members 33 and 34 which limit the stroke of the displacer. The resilient members 33 and 34 and the displacer 3 constitute a mass/spring system with the result that the displacer, like the piston, performs a purely harmonic movement of the same frequency as the piston, but at a phase difference with respect thereto. The spring constants of the resilient members 33 and 34 and the mass of the displacer 3 have been chosen such that the frequency $f_1$ at which this system can resonate is higher than the resonant frequency $f$ of the system formed by piston/armature coil assembly and working medium. During operation with equal oscillating frequencies of piston 2 and displacer 3, the volume variation of expansion space 6 then leads with respect to the pressure variation occurring in this space, with the result that cold is produced in expansion space 6. Optimum cold production is achieved when $f_1$ exceeds $f$ by at least 20%, preferably by about 30%.

Because the piston as well as the displacer perform a purely harmonic movement of a frequency which is constant in time, the sum of these movements is again a purely harmonic movement of constant frequency. The mechanical vibration of the machine produced by the harmonic piston and displacer movement, consequently can be readily balanced by means of generally known passive vibration dampers such as a mass/spring system (not shown).

Figure 3:
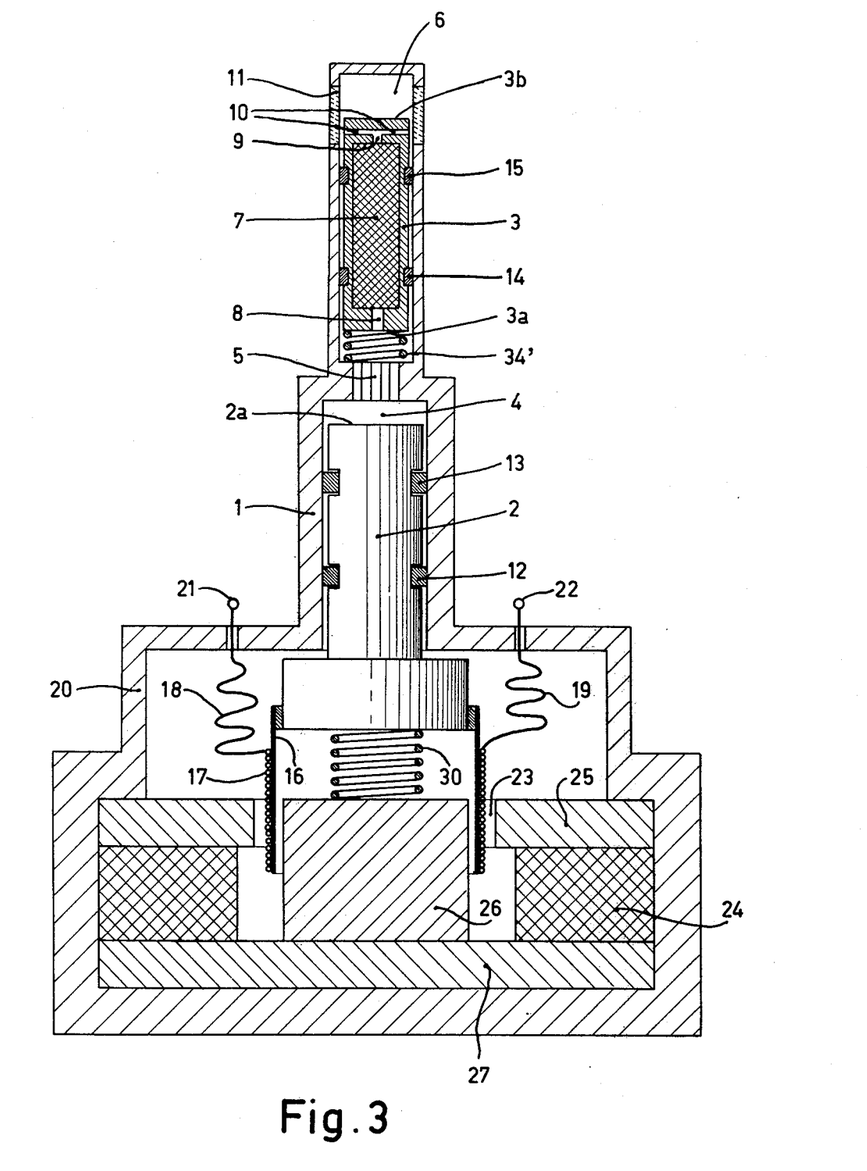
FIG. 3 is a longitudinal sectional view of a cold-gas refrigerator in which the displacer is provided with a cooperating resilient member only on its lower side.

The cold gas refrigerator shown in FIG. 3 differs from that shown in FIG. 2 mainly in that the resilient members 33 and 34 have been replaced by only one resilient member 34' which is connected on the one side to the lower side of the displacer 3 and on the other side to the cylinder wall. The advantage thereof is the elimination of dead space in the expansion space.

However, the resilient member 34' still gives rise to dead space in the compression space 4. The latter is avoided in the cold-gas refrigerators shown in the FIGS. 4 and 5, in which the resilient member is accommodated in an intermediate space formed by the cooperating displacer wall and cylinder wall.

Figure 4:
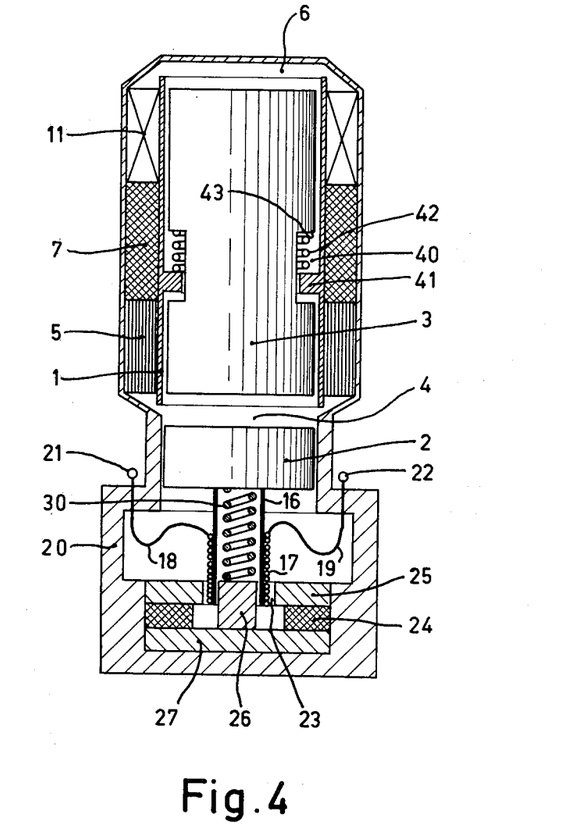
FIGS. 4 and 5 are longitudinal sectional views of cold-gas refrigerators in which a resilient member which cooperates with the displacer is provided between the cooperating displacer wall and cylinder wall.

In the cold-gas refrigerator shown in FIG. 4, the displacer has a smaller diameter at the location of spring 42, with the result that an annular intermediate space 40 is formed between cylinder 1 and displacer 3. The wall of cylinder 1 is provided with a projection 41. Resilient member 42 is connected on the one side to projection 41 and on the other side to annular face 43 of displacer 3.

Figure 5:
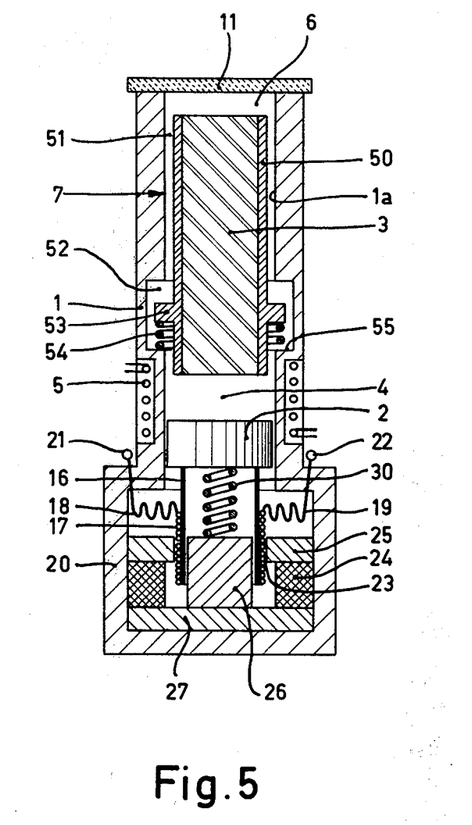

In the cold-gas refrigerator shown in FIG. 5, the regenerator 7 is constructed as a gap-type regenerator. For this purpose, a displacer 3, made of a synthetic material of low thermal conductivity, is provided with a thin stainless steel jacket 50, the cylinder wall 1a also being made of stainless steel.

Working medium on its way from compression space 4 to expansion space 6 flows through gap 51 while giving off heat to the regenerative metal walls 50 and 1a. When the working medium flows in the reverse direction, it takes up the heat stored in these metal walls.

Cylinder 1 has a longitudinal portion of smaller wall thickness at the location of spring 54, with the result that an intermediate space 52 is formed between the cylinder wall and the displacer wall. Present in this intermediate space 52 are a projection 53 of the displacer 3 and a resilient member 54 which is connected on the one side to the lower side of projection 53 and on the other side to annular face 55 of cylinder 1.

What is claimed is

1. A cold-gas refrigerator comprising a working space which is formed inside at least one cylinder and in which a working medium performs a thermodynamic cycle, the said working space comprising a compression space of higher mean temperature during operation and an expansion space of lower mean temperature during operation, the said spaces communicating with each other via heat exchangers, including a regenerator, the working surface of a piston which is coupled to a drive varying the volume of the compression space during operation so as to generate pressure variations in the working medium, one working surface of a displacer which is reciprocatable at a phase difference with respect to the piston varying the volume of the expansion space and the other working surface thereof varying the volume of the compression space in response to the pressure variations, characterized in that the piston has an electro-dynamic drive comprising an armature coil which is coupled to the piston and which is supplied during operation with an alternating current having a frequency $f_o$, the said armature coil being reciprocatable in a permanent magnetic field, produced by a magnetic circuit, under the influence of Lorentz forces exerted on the armature coil, the system formed by piston/armature coil-assembly and working medium resonating during operation at a resonant frequency $f$ which at least substantially corresponds to the frequency $f_o$ and which satisfies the relation:

$$f = \sqrt{\frac{S^2 \cdot P_m}{M \cdot T_o \left\{ \frac{1}{H_c} \cdot \frac{V_c}{T_c} + \frac{1}{H_e} \cdot \frac{V_e}{T_e} + \sum_{i=1}^{n} \frac{V_{w_i}}{T_{w_i}} \right\}}}$$

in which
$S$ = working surface of the piston
$P_m$ = mean working medium pressure in the working space of the machine
$M$ = total mass of the piston/armature coil-assembly
$T_o$ = ambient temperature in degrees Kelvin $$H_c = \left(\frac{C_p}{C_v}\right)_c = \frac{\text{specific heat at constant pressure}}{\text{specific heat at constant volume}}$$

of the working medium in the compression space
$V_c$ = volume of the compression space
$T_c$ = mean operating temperature in degrees Kelvin of the working medium in the compression space $$H_e = \left(\frac{C_p}{C_v}\right)_e = \frac{\text{specific heat at constant pressure}}{\text{specific heat at constant volume}}$$

of the working medium in the expansion space
$V_e$ = volume of the expansion space
$T_e$ = mean operating temperature in degrees Kelvin of the working medium in the expansion space
$V_{w_i}$ = the working medium volume of the $i^{th}$ heat exchanger
$T_{w_i}$ = the mean operating temperature in degrees Kelvin of the working medium in the $i^{th}$ heat exchanger
$n$ = total number of heat exchangers.

2. A cold-gas refrigerator as claimed in claim 1, characterized in that at least one resilient member which cooperates with the displacer is provided as a displacer stroke limiting means, the resilient member and the displacer having a spring constant and mass, respectively, such that the system formed by resilient member and displacer has a resonant frequency $f_1$ which exceeds the resonant frequency $f$ of the system formed by piston/armature coil-assembly and working medium.

3. A cold-gas refrigerator as claimed in claim 2, characterized in that the resonant frequency $f_1$ exceeds the resonant frequency $f$ by at least 20%.

4. A cold-gas refrigerator as claimed in claim 2 characterized in that the resilient member is accommodated in an intermediate space situated between the expansion space and the compression space, the said intermediate space being formed by cooperating wall portions of displacer and cylinder.

5. In a cold gas refrigerator operable with a source of alternating current having frequency $f_o$, and including a housing, compression and expansion pistons reciprocally movable in corresponding cylinders and defining therewith variable volume compression and expansion spaces in which a working medium performs a thermodynamic cycle, with a relatively higher mean temperature in the compression space and a relatively lower mean temperature in the expansion space, said refrigerator including drive means for driving said compression piston the movement of which generates pressure variations in the working medium which drive said expansion piston, with a phase difference between said pistons, the improvement in combination therewith wherein said drive means comprises a linear electric motor activated by said source of a.c. current, and an armature of said motor reciprocally driving said compression piston, said armature, compression piston, and working medium comprising a system which resonates during operation of the refrigerator at a resonant frequency $f$ which at least substantially corresponds to the frequency $f_o$ and which satisfies the relation.

6. Apparatus according to claim 5 comprising at least one resilient member mounted in said housing and engaging said expansion piston for limiting the stroke thereof, said resilient member and expansion piston having a spring constant and mass, respectively, such that the system comprising said resilient member and expansion piston has a resonant frequency $f_1$ which exceeds the resonant frequency $f$ of the system comprising said armature compression piston and working medium.

7. Apparatus according to claim 6 wherein said resonant frequency $f_1$ exceeds the resonant frequency $f$ by at least 20%.

8. Apparatus according to claim 6 wherein said housing defines an intermediate space intermediate said compression and expansion spaces and defined in part by adjacent and spaced apart wall portions of said expansion piston and the corresponding cylinder.

* * * * *

UNITED STATES PATENT AND TRADEMARK OFFICE
CERTIFICATE OF CORRECTION

PATENT NO. : 3,991,585
DATED : November 16, 1976
INVENTOR(S) : JAN MULDER

It is certified that error appears in the above-identified patent and that said Letters Patent are hereby corrected as shown below:

Column 2, line 50, delete "working medium in the compression space" (in small print).

Column 5, line 60, after "cylinder" insert --1--

Signed and Sealed this

Twentieth Day of September 1977

[SEAL]

Attest:

RUTH C. MASON
Attesting Officer

LUTRELLE F. PARKER
Acting Commissioner of Patents and Trademarks